US012601654B1

(12) United States Patent
Hartman et al.

(10) Patent No.: US 12,601,654 B1
(45) Date of Patent: Apr. 14, 2026

(54) ELECTROMAGNETIC VIBRATION SYSTEM AND METHOD

(71) Applicant: Honeywell Federal Manufacturing & Technologies, LLC, Kansas City, MO (US)

(72) Inventors: Seth D. Hartman, Belton, MO (US); Erik Joseph Timpson, Olathe, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 365 days.

(21) Appl. No.: 18/132,697

(22) Filed: Apr. 10, 2023

Related U.S. Application Data

(60) Provisional application No. 63/329,960, filed on Apr. 12, 2022.

(51) Int. Cl.
|  |  |
|---|---|
| *G01M 7/02* | (2006.01) |
| *B02C 19/18* | (2006.01) |
| *G01P 21/00* | (2006.01) |

(52) U.S. Cl.
CPC ............. *G01M 7/022* (2013.01); *B02C 19/18* (2013.01); *G01P 21/00* (2013.01)

(58) Field of Classification Search
None
See application file for complete search history.

(56) References Cited

U.S. PATENT DOCUMENTS

| | | | |
|---|---|---|---|
| 3,296,928 A | 1/1967 | Lubbers | |
| 4,369,759 A | 1/1983 | Gerstenberger et al. | |

| | | | |
|---|---|---|---|
| 4,387,859 A | * | 6/1983 | Gurries ..................... B02C 1/02 |
| | | | 241/266 |
| 4,449,441 A | | 5/1984 | McAllister |
| 4,527,457 A | | 7/1985 | Fikse |
| 4,741,271 A | | 5/1988 | Delvecchio et al. |

(Continued)

FOREIGN PATENT DOCUMENTS

| | | |
|---|---|---|
| WO | 01/31279 | 5/2001 |
| WO | 2006088584 | 8/2006 |

OTHER PUBLICATIONS

Non-Final Office Action mailed Sep. 9, 2022 in U.S. Appl. No. 17/498,789, 8 pages.

(Continued)

*Primary Examiner* — Suman K Nath

(74) *Attorney, Agent, or Firm* — Hovey Williams LLP

(57) ABSTRACT

A system for testing a device comprises a stator, an armature, a power input, a sensor, and a processing element. The stator includes stator coils, and the armature is movably coupled to the stator. The armature supports the device and comprises rotor coils. The power input is configured to couple with a power supply to provide power to the stator coils and/or the rotor coils. The sensor captures data associated with movement of the armature. The processing element activates the stator coils or the rotor coils to cause the armature to move along the stator to replicate a time domain waveform; receives signals representative of the data; compares the data to the time domain waveform to determine a difference between the two; and adjusts an amount of power provided to the stator coils or the rotor coils to minimize the difference.

20 Claims, 6 Drawing Sheets

(56)     References Cited

U.S. PATENT DOCUMENTS

| | | | |
|---|---|---|---|
| 4,960,760 | A | 10/1990 | Wang et al. |
| 5,017,549 | A | 5/1991 | Robertson |
| 5,074,189 | A | 12/1991 | Kurtz |
| 5,189,244 | A | 2/1993 | Weldon |
| 5,763,812 | A | 6/1998 | Collins |
| 6,694,856 | B1 | 2/2004 | Chen et al. |
| 6,696,775 | B2 | 2/2004 | Engel |
| 7,047,863 | B2 | 5/2006 | Hawkes et al. |
| 7,077,047 | B2 | 7/2006 | Frasca |
| 7,526,988 | B2 | 5/2009 | Elder |
| 7,549,365 | B2 | 6/2009 | Root, Jr. |
| 7,614,393 | B1 | 11/2009 | Lu |
| 7,950,379 | B2 | 5/2011 | Tidman |
| 8,302,584 | B1 | 11/2012 | Lu |
| 8,677,878 | B1 | 3/2014 | Floyd et al. |
| 8,686,576 | B1 | 4/2014 | Smith |
| 9,341,435 | B1 | 5/2016 | Mansfield |
| 9,354,019 | B2 | 5/2016 | Gonzaga |
| 10,082,360 | B2 | 9/2018 | Hartman et al. |
| 10,218,251 | B2 | 2/2019 | Hartman et al. |
| 10,511,215 | B2 | 12/2019 | Hartman et al. |
| 10,527,384 | B2 | 1/2020 | Hartman et al. |
| 10,823,523 | B1 | 11/2020 | Wynes |
| 10,907,928 | B1 | 2/2021 | Timpson et al. |
| 10,976,129 | B1 | 4/2021 | Timpson et al. |
| 10,976,130 | B1 | 4/2021 | Timpson et al. |
| 10,982,926 | B2 | 4/2021 | Hartman et al. |
| 11,073,357 | B2 | 7/2021 | Hartman et al. |
| 11,150,047 | B2 | 10/2021 | Griffin |
| 11,209,229 | B2 | 12/2021 | Perez |
| 11,291,101 | B2 | 3/2022 | Timpson et al. |
| 11,309,783 | B2 | 4/2022 | Hartman et al. |
| 11,469,025 | B2 | 10/2022 | Hartman et al. |
| 11,561,055 | B2 | 1/2023 | Kirstein |
| 11,668,544 | B1 | 6/2023 | Timpson et al. |
| 2008/0011091 | A1* | 1/2008 | Weldon, Jr. ......... G01M 5/0066 |
| | | | 73/766 |
| 2010/0002353 | A1 | 1/2010 | Barinov |
| 2012/0137870 | A1 | 6/2012 | Lindsay et al. |
| 2015/0177195 | A1* | 6/2015 | Sasaki ............... G01N 29/4436 |
| | | | 73/579 |
| 2015/0226507 | A1 | 8/2015 | Palmer |
| 2022/0406506 | A1 | 12/2022 | Hartman et al. |
| 2023/0117348 | A1 | 4/2023 | Timpson et al. |

OTHER PUBLICATIONS

Bo Tang et al., "Method of ballistic control and projectile rotation in a novel railgun" Defence Technology, 628-634, Jul. 2018, 6 pages.

International Search Report and Written Opinion in PCT Application PCT/IB2017/053782 mailed Sep. 14, 2017, 16 pages.

International Search Report and Written Opinion in PCT Application PCT/IB2017/053780 mailed Sep. 14, 2017, 16 pages.

* cited by examiner

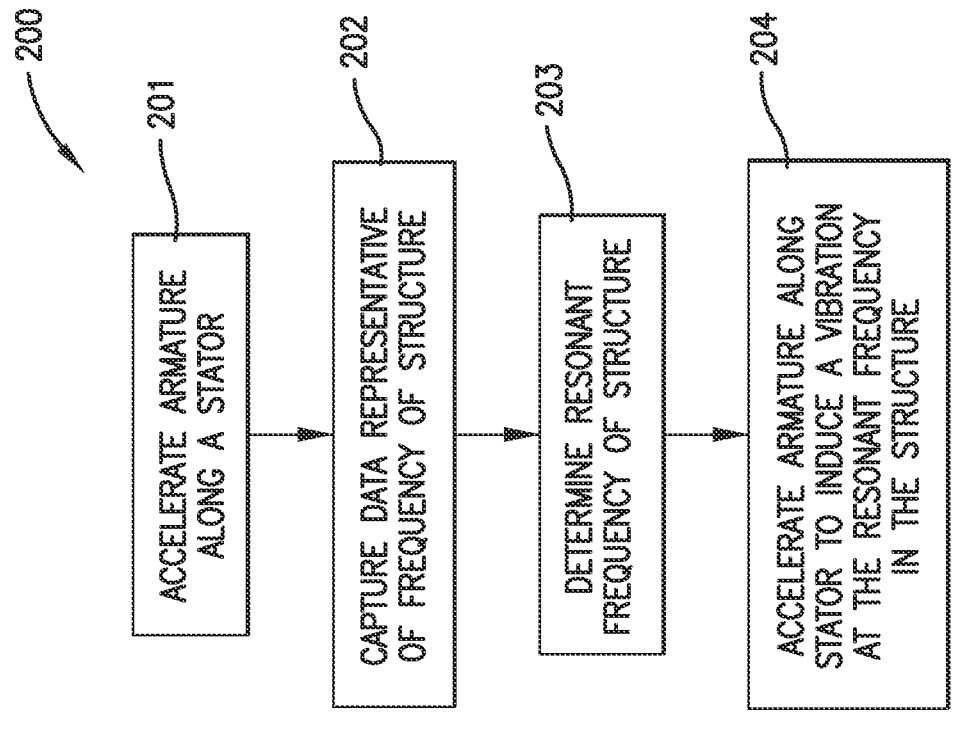

200

201
ACCELERATE ARMATURE ALONG A STATOR

202
CAPTURE DATA REPRESENTATIVE OF FREQUENCY OF STRUCTURE

203
DETERMINE RESONANT FREQUENCY OF STRUCTURE

204
ACCELERATE ARMATURE ALONG STATOR TO INDUCE A VIBRATION AT THE RESONANT FREQUENCY IN THE STRUCTURE

Fig. 8.

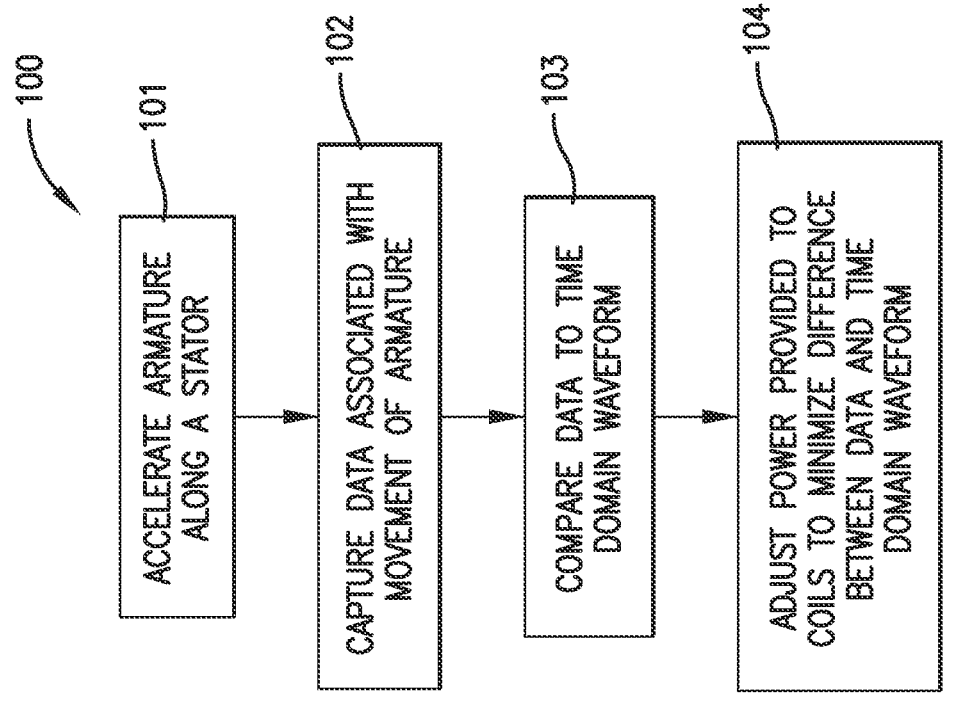

100

101
ACCELERATE ARMATURE ALONG A STATOR

102
CAPTURE DATA ASSOCIATED WITH MOVEMENT OF ARMATURE

103
COMPARE DATA TO TIME DOMAIN WAVEFORM

104
ADJUST POWER PROVIDED TO COILS TO MINIMIZE DIFFERENCE BETWEEN DATA AND TIME DOMAIN WAVEFORM

Fig. 7.

ELECTROMAGNETIC VIBRATION SYSTEM AND METHOD

RELATED APPLICATIONS

The present application is a non-provisional application and claims priority of U.S. Provisional Patent Application Ser. No. 63/329,960 filed on Apr. 12, 2022, and entitled "ELECTROMAGNETIC VIBRATION SYSTEM AND METHOD," which is hereby incorporated in its entirety by reference herein.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Accelerometers, gyroscopes, and other sensing devices must be tested in a controlled environment to mimic real-world accelerations and other conditions before being implemented in a system. However, creating such a test environment is often difficult because real-world applications often involve extreme accelerations and decelerations. Testing relatively larger structures to mimic real-world applications is similarly difficult and often requires at least partial destruction of the structures. This is inefficient and costly, especially if no defects are present.

The background discussion is intended to provide information related to the present invention which is not necessarily prior art.

SUMMARY

The present invention solves the above-described problems and other problems by providing systems and methods of testing sensing devices and structures as well as demolishing structures.

A testing system constructed according to an embodiment of the present invention comprises a stator, an armature, a power input, a sensor, and a processing element. The stator comprises stator coils, and the armature is movably coupled to the stator. The armature is configured to support the device and comprises rotor coils. The power input is configured to couple with a power supply to provide power to the stator coils and/or the rotor coils. The sensor is configured to capture data associated with movement of the armature.

The processing element is in communication with the sensor and is configured to activate the stator coils and/or the rotor coils to cause the armature to move along the stator to replicate a predetermined time domain waveform; receive from the sensor a signal representative of the data; compare the data to the time domain waveform to determine a difference between the two; and adjust an amount of power provided to the stator coils and/or the rotor coils to minimize the difference. By controlling the armature via the processing element and the sensor, a number of time domain waveforms representing different types of tests can be achieved. Further, electromagnetic acceleration via a stator and armature provides an efficient means to accelerate the device.

Another embodiment of the invention is a method of demolishing a structure. The method broadly comprises accelerating an armature along a stator to induce a vibration in the structure; capturing, via a sensor, data representative of a frequency of the structure when the armature is moving along the stator; determining a resonant frequency of the structure based on the data; and accelerating the armature along the stator to induce a vibration at the resonant frequency in the structure.

Another embodiment of the invention is a system for demolishing a structure. The system broadly comprises a stator, an armature, a power input, a sensor, and a processing element. The stator comprises stator coils, and the armature is movably coupled to the stator and comprises rotor coils. The power input is configured to couple with a power supply to provide power to the stator coils and/or the rotor coils. The sensor is configured to detect vibrations of the structure.

The processing element is in communication with the sensor and is configured to activate the stator coils and/or the rotor coils to cause the armature to move to induce a vibration in the structure; receive from the sensor a signal representative of data comprising a frequency of vibrations of the structure; determine a resonant frequency of the structure based on the data; and activate the stator coils and/or the rotor coils to induce a vibration in the structure at the resonant frequency of the structure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 7 is a flowchart depicting exemplary steps of a method according to an embodiment of the present invention; and FIG. 8 is a flowchart depicting exemplary steps of a method according to an embodiment of the present invention.

Figure 1:
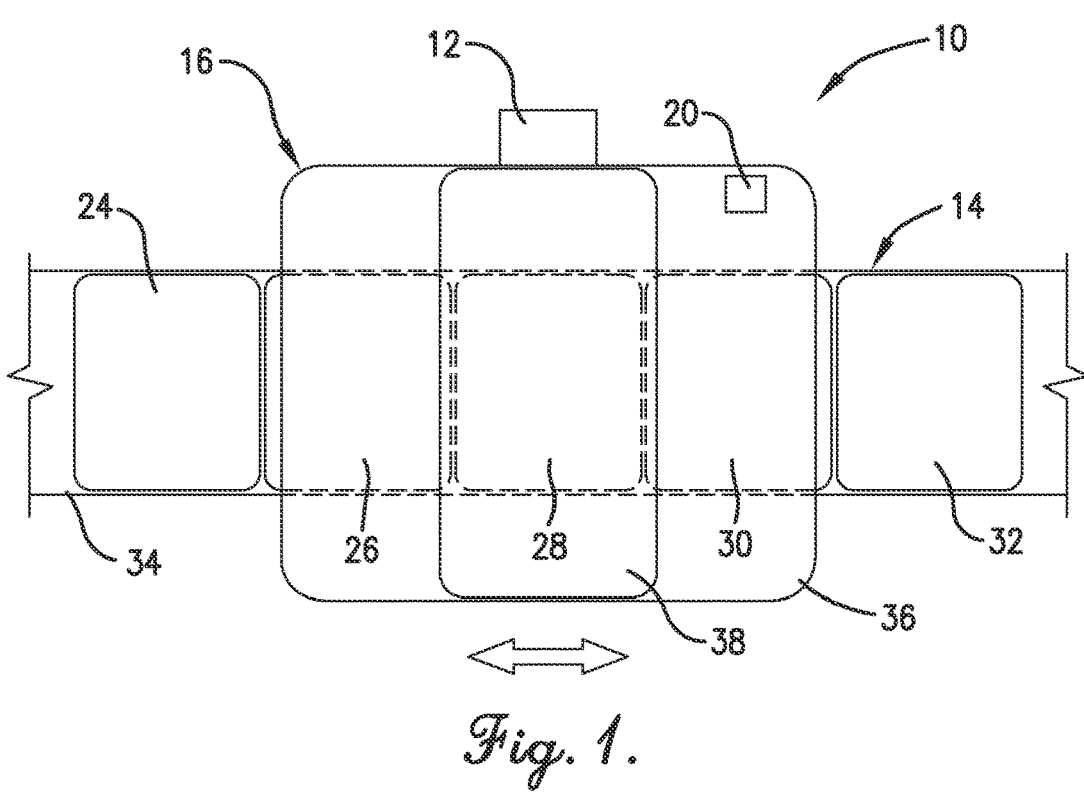
FIG. 1 is a schematic diagram of a system constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a system 10 constructed in accordance with an embodiment of the invention is illustrated. The system 10 is configured to test a device 12, such as an accelerometer, gyroscope, or the like. In some embodiments, the device 12 is a structure, such as a housing or model structure. The device 12 may be removably secured to the system 10. The system 10 comprises a stator 14, an armature 16, a power supply 18 (depicted in FIG. 2), a sensor 20, and a controller 22 (depicted in FIG. 2).

The stator 14 supports and guides the armature 16 and comprises a plurality of stator coils 24, 26, 28, 30, 32 supported on a stator body 34. The stator coils 24, 26, 28, 30, 32 are operable to be selectively connected to the power supply 18—as directed by the controller 22—in order to produce electromagnetic fields that interact with the electromagnetic fields of one or more rotor coils (discussed in detail below) of the armature 16. The stator coils 24, 26, 28, 30, 32 may be wound about the stator body 34 so that they are coaxial with the stator 14. The stator coils 24, 26, 28, 30, 32 are depicted as being segments of coils; however, the stator coils 24, 26, 28, 30, 32 may be configured and activated any number of ways without departing from the scope of the present invention. Further, each of the segments of stator coils 24, 26, 28, 30, 32 may be operable to be individually activated, deactivated, and/or have their polarities reversed (e.g., change the direction of the current flowing through the coils). The stator body 34 supports the stator coils 24, 26, 28, 30, 32 and may comprise titanium. The stator 14 may define a linear, closed-loop, circular, or helical path for the armature 16 to travel. However, the stator 14 may define any path without departing from the scope of the present invention.

The armature 16 is movably coupled to the stator 14. The armature 16 is configured to support the device 12 and may comprise an armature body 36 that at least partially encloses the stator 14 (the dotted lines of the stator 14 indicating portions thereof enclosed by the armature 16) and rotor coils 38. The armature body 36 may be operable to move along the stator 14 in either direction, as indicated by the arrow. The armature body 36 supports the rotor coils 38 and may comprise carbon fiber. The rotor coils 38 are supported on the body 36 and are operable to be selectively connected to the power supply 18—as directed by the controller 22—in order to produce electromagnetic fields that interact with the electromagnetic fields of the stator coils 24, 26, 28, 30, 32. Further, the rotor coils 38 may be operable to be individually activated, deactivated, and/or have their polarities reversed (e.g., change the direction of the current flowing through the coils).

Figure 2:
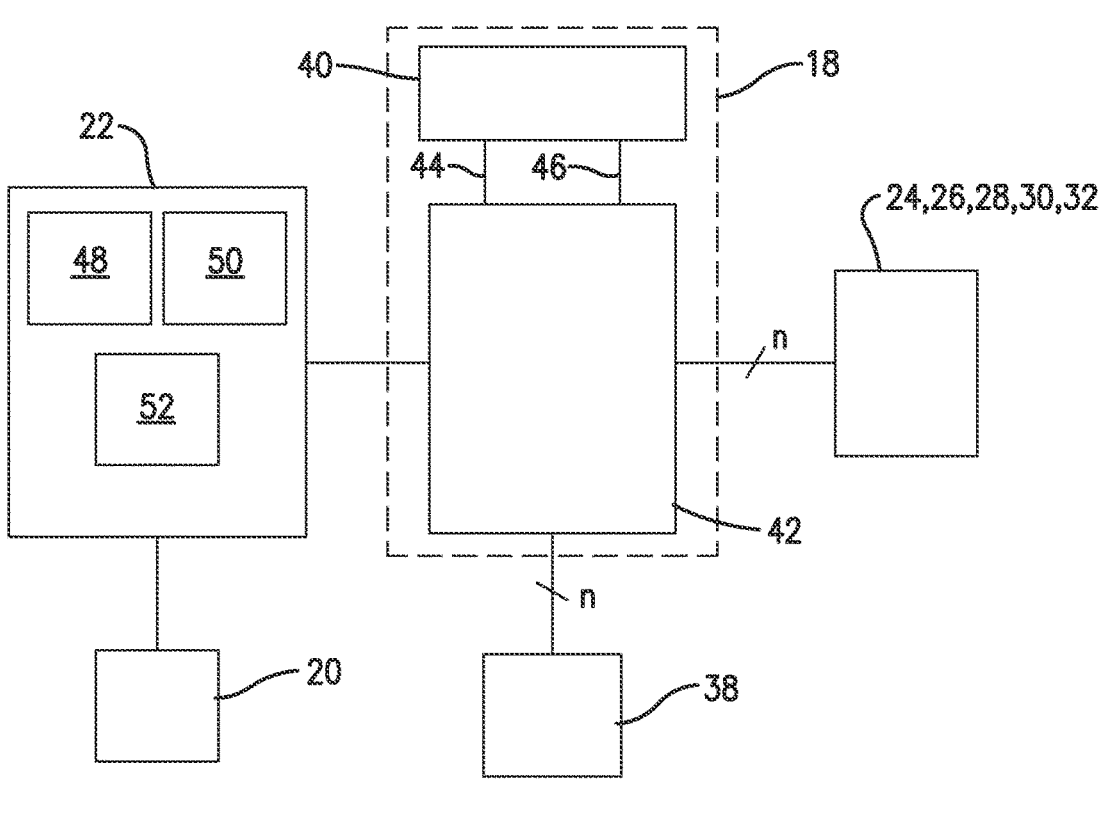
FIG. 2 is a block diagram depicting selected components of the system of FIG. 1.

Turning to FIG. 2, the power supply 18 is configured to provide power to the stator coils 24, 26, 28, 30, 32 and/or the rotor coils 38. The power supply 18 may comprise a power source 40 and a switching network 42. The power source 40 may be an AC or DC power source (such as a convertor or connection to an energy grid), a power storage device, such as one or more super capacitor (e.g., a capacitor having a capacitance over 100 F, a double-layer capacitor, a hybrid capacitor, a pseudocapacitor, etc.), or a battery. The power source 40 may include two or more terminals 44, 46, such as a high voltage terminal 44 and a relatively low voltage terminal 46, or ground. The switching network 42 may be a series of contacts, switches, or the like that receive signals from the controller 22 and connect one or more coils of the stator coils 24, 26, 28, 30, 32 and/or the rotor coils 38 to one or more of the terminals 44, 46. In some embodiments, the switching network 42 may comprise a plurality of insulated gate bipolar transistors (IGBT). In some embodiments, the power supply 18 comprises a pulse forming network (PFN) comprising a plurality of energy storage devices, such as supercapacitors, and a switching network operable to provide a pulse of energy to the stator coils 24, 26, 28, 30, 32 and/or the rotor coils 38. In some embodiments, the power supply may be power inputs or contacts for receiving power from an external power source. In some embodiments, the switching network 42 may comprise diamond-coated brush contacts.

The sensor 20 is configured to capture data associated with movement of the armature 16 (depicted in FIG. 1). For example, the sensor 20 may detect a position, velocity, and/or acceleration of the armature 16 (depicted in FIG. 1). The sensor 20 is in communication with the controller 22 and is configured to gather data associated with the armature 16 and transmit that data to the controller 22. The sensor 20 may comprise an inertial measurement unit, accelerometer, gyroscope, distance sensor, or the like.

The controller 22 is in communication with the power supply 18 and the sensor 20. The controller 22 may comprise a communication element 48, a memory element 50, and a processing element 52. The communication element 48 may generally allow communication with systems or devices external to the controller 22. The communication element 48 may include signal or data transmitting and receiving circuits, such as antennas, amplifiers, filters, mixers, oscillators, digital signal processors (DSPs), and the like. The communication element 48 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 48 may be in communication with the processing element 52 and the memory element 50.

The memory element 50 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 50 may be embedded in, or packaged in the same package as, the processing element 52. The memory element 50 may include, or may constitute, a "computer-readable medium". The memory element 50 may store the instructions, code, code segments, software, firmware, programs, applications, apps, services, daemons, or the like that are executed by the processing element 52.

The processing element 52 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 52 may generally execute, process, or run instructions, code, code segments, software, firmware, programs, applications, apps, processes, services, daemons, or the like. The processing element 52 may also include hardware components such as finite-state machines, sequential and combinational logic, and other electronic circuits that can perform the functions necessary for the operation of the current invention. The processing element 52 may be in communication with the other electronic components through serial or parallel links that include address busses, data busses, control lines, and the like.

The processing element 52 may be in communication with the above components via the communication element 48 and/or direct wiring. The processing element 52 may be configured to send and/or receive information to and/or from the above components. For example, the processing element 52 may be configured to direct the power supply 18 to activate the stator coils 24, 26, 28, 30, 32 and/or the rotor coils 38 to cause the armature 16 (depicted in FIG. 1) to move along the stator 14 (depicted in FIG. 1) to replicate a predetermined time domain waveform.

In some embodiments, the processing element 52 may be configured to activate certain stator coils so that they generate electromagnetic forces that push or pull the rotor coils and therefore the armature (push/pull stator coils). The processing element 52 may also be configured to activate certain rotor coils so that they generate electromagnetic forces that push or pull against the stator coils (push/pull rotor coils). Further, the processing element 52 may be configured to stack forces applied to the armature 16 by activating pull stator coils, push stator coils, pull rotor coils, and/or push rotor coils (stacked coils).

For example, turning briefly back to FIG. 1, the processing element 52 may be configured to: (1) cause the rotor coils 38 to be activated as the armature 16 moves along stator 14; (2) simultaneously cause stator coils 30 and/or stator coils 32 to be activated with a polarity that pulls the rotor coils 38; and (3) simultaneously cause stator coils 24 and/or stator coils 26 to be activated with a polarity that pushes the rotor coils 38. This increases the amount of force applied to the armature 16, which allows for increased acceleration and speeds and/or increased deceleration (quicker stops or reversals of direction of movement along the stator 14). While FIG. 1 depicts only one set of rotor coils 38, the armature 16 may have any number of sets of rotor coils 38 without departing from the scope of the present invention.

Turning back to FIG. 2, the predetermined time domain waveform may be stored on the memory element 50 and may include shock pulses. The processing element 52 may receive from the sensor 20 a signal representative of the data comprising the position, velocity, and/or acceleration of the armature 16. The processing element 52 may be configured to compare the position of the armature 16 to the time domain waveform to determine a difference between the time domain waveform and the data.

The processing element 52 is configured to adjust an amount of power provided to at least one of the stator coils 24, 26, 28, 30, 32 and/or the rotor coils 38 to minimize the difference. For example, the processing element 52 may be configured to direct the power supply 18 to adjust an amount of power provided. The processing element 52 may be configured to direct the power source 40 to reduce an amount of power output. Alternatively or additionally, the processing element 52 may be configured to direct the switching network 42 to disconnect one or more stator coils 24, 26, 28, 30, 32 and/or rotor coils 38.

Alternatively, the predetermined time domain waveform may include one or more series of vibrations representative of an earthquake or other real-world vibration. The processing element 52 may be configured to direct the power supply 18 to activate the stator coils 24, 26, 28, 30, 32 and/or the rotor coils 38 to cause the armature 16 (depicted in FIG. 1) to move to induce a vibration in the device 12 (depicted in FIG. 1). The processing element 52 may be configured to receive from the sensor 20 a signal representative of data comprising a frequency of vibrations of the armature 16 (depicted in FIG. 1) to make sure the vibrations match the predetermined time domain waveform. In some embodiments, the processing element 52 may be configured to direct the power supply 18 to activate the stator coils 24, 26, 28, 30, 32 or the rotor coils 38 to induce a vibration in the device 12 (depicted in FIG. 1) that is the resonant frequency of the device 12 (depicted in FIG. 1).

By controlling the armature 16 (depicted in FIG. 1) via the processing element 52 according to a time domain waveform, a wide variety of types of tests can be achieved. Further, electromagnetic acceleration via the stator 14 (depicted in FIG. 1) and armature 16 (depicted in FIG. 1) provides an efficient means to accelerate the device 12 (depicted in FIG. 1).

Figure 3:
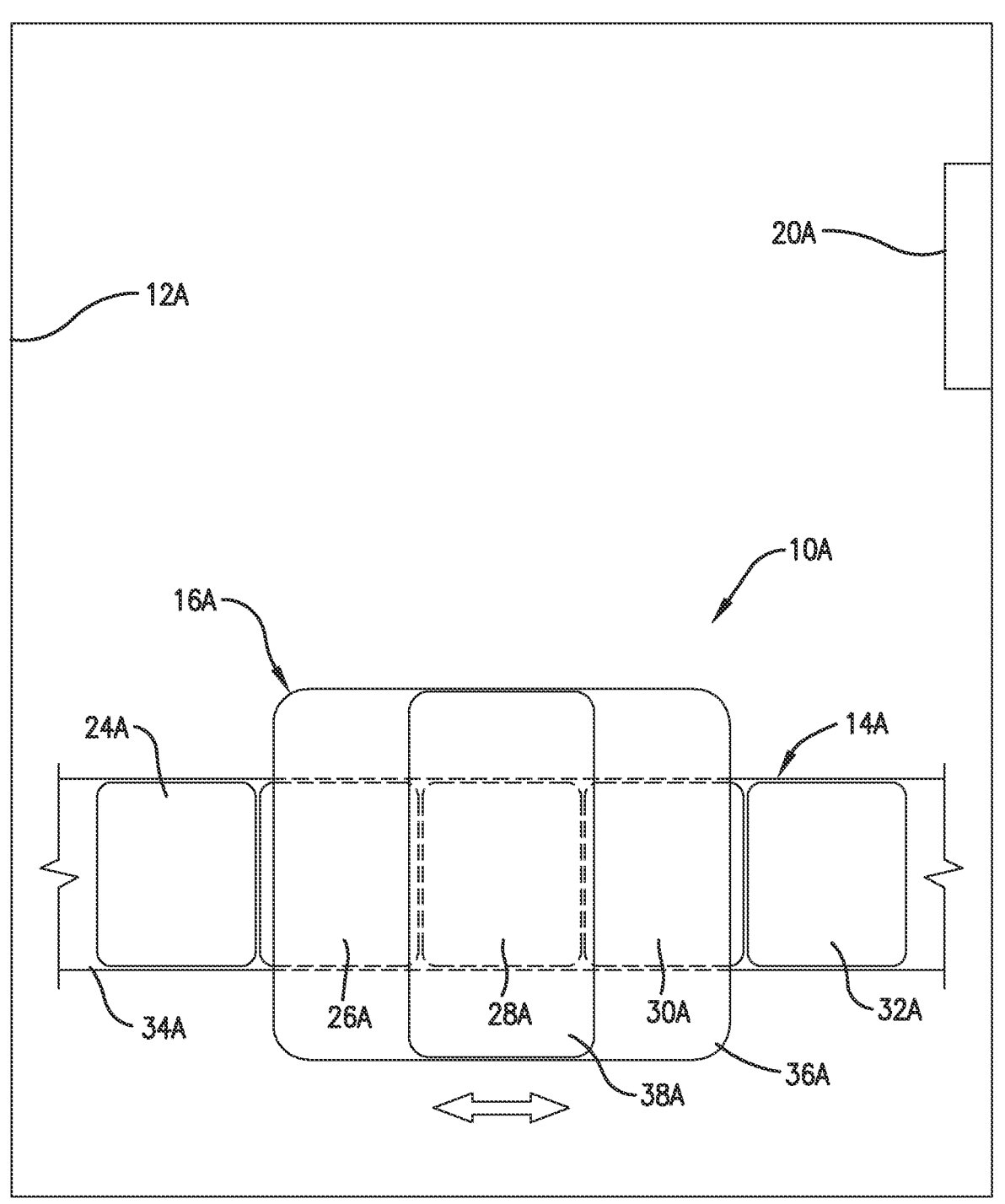
FIG. 3 is a schematic diagram of a system constructed in accordance with another embodiment of the present invention and configured to test and/or destroy a structure.

A system 10A constructed in accordance with another embodiment of the invention is shown in FIG. 3. The system 10A may comprise substantially similar components as system 10; thus, the components of system 10A that correspond to similar components in system 10 have an 'A' appended to their reference numerals. The principal difference between system 10A and system 10 is that the system 10A is configured to test from within the physical structure 12A (such as a building, warehouse, house, housing, etc.) with the sensor 20A connected to the structure 12A and the processing element being configured to direct the armature 16A to induce vibrations in the structure 12A to detect the structural integrity of the structure 12A and/or demolish the structure 12A.

For example, the processing element may be configured to direct the power supply to activate the stator coils 24A, 26A, 28A, 30A, 32A and/or the rotor coils 38A to cause the armature 16A to move to induce a vibration in the structure 12A, and receive from the sensor 20A a signal representative of data comprising a frequency of vibrations of the structure 12A. The processing element may be configured to determine whether there are any structure issues with the structure 12A based on historic data stored in the memory element.

Additionally or alternatively, the processing element may be configured to determine a resonant frequency of the structure 12A based on the data. The processing element may be configured to direct the power supply to activate at least one of the stator coils 24A, 26A, 28A, 30A, 32A or the rotor coils 38A to induce a vibration in the structure 12A at the determined resonant frequency. The sensor 20A may collect data of the response of the structure 12A while the resonant frequency is induced and send the data to the processing element. The processing element may be configured to determine any structural issues based on this data. The processing element may be configured to continue to direct the armature 16A to induce the resonant frequency to destroy the structure 12A, for example, if a structural issue is detected in the structure 12A. While the system 10A is depicted in a horizontal position relative to the structure 12A, the system 10A may have any orientation without departing from the scope of the present invention.

Figure 4:
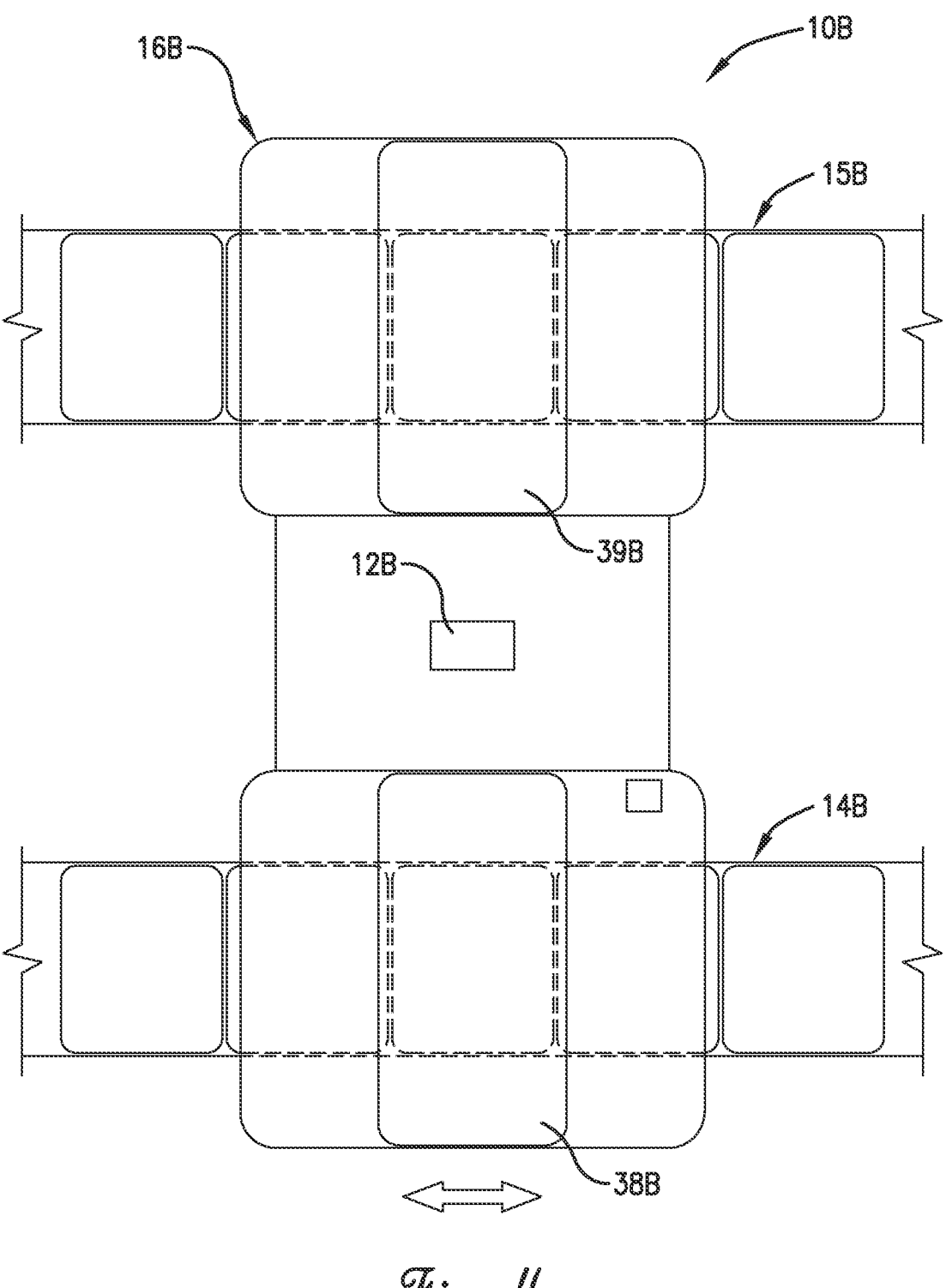
FIG. 4 is a schematic diagram of a system constructed in accordance with another embodiment of the present invention and having two stators.

A system 10B constructed in accordance with another embodiment of the invention is shown in FIG. 4. The system 10B is configured to support the device 12B and may comprise substantially similar components as system 10; thus, the components of system 10B that correspond to similar components in system 10 have a 'B' appended to their reference numerals. The principal difference between system 10B and system 10 is that the system 10B comprises two stators 14B, 15B that propel the armature 16B, and the armature 16B has two sets of rotor coils 38B, 39B that interact with the stators 14B, 15B, respectively.

Figure 5:
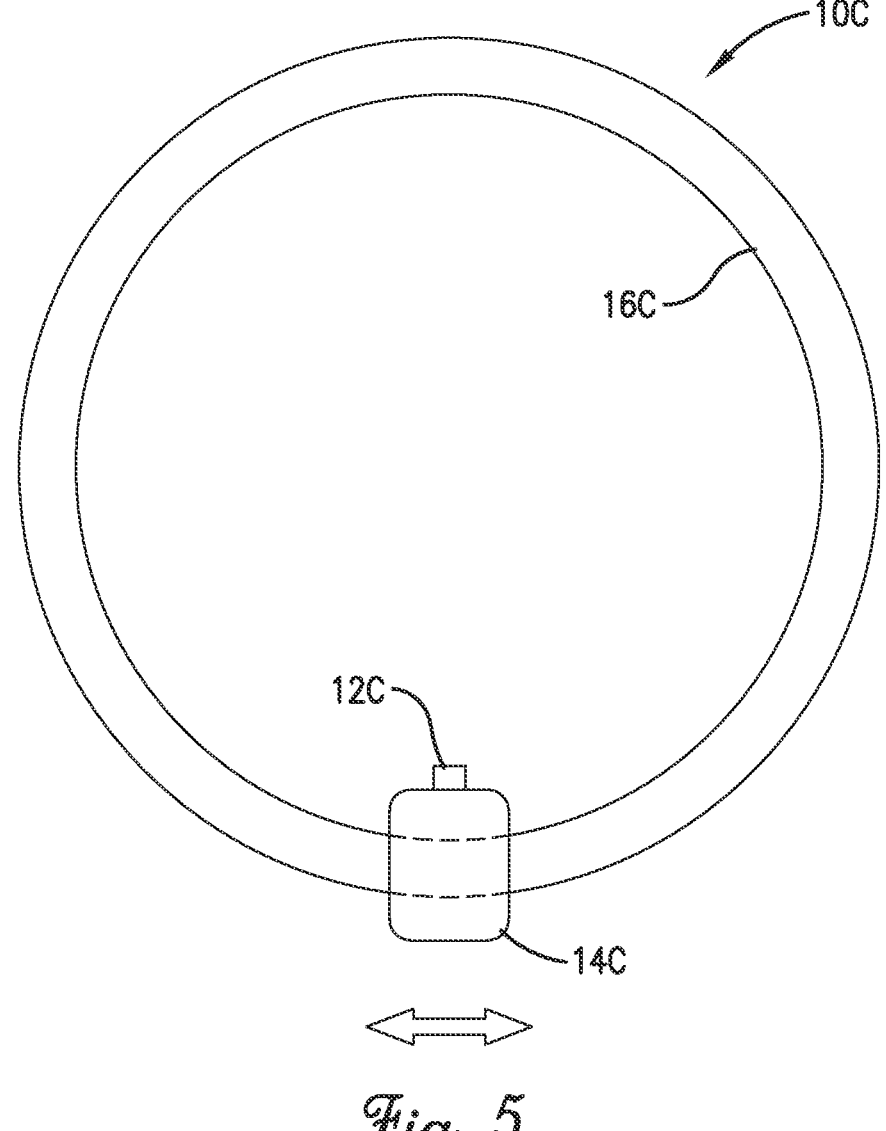
FIG. 5 is a schematic diagram of a system constructed in accordance with another embodiment of the present invention and having a circular stator.

A system 10C constructed in accordance with another embodiment of the invention is shown in FIG. 5. The system 10C is configured to support the device 12C and may comprise substantially similar components as system 10; thus, the components of system 10C that correspond to similar components in system 10 have a 'C' appended to their reference numerals. The principal difference between system 10C and system 10 is that the system 10C comprises a circular stator 14C that propels the armature 16C along a circular path.

Figure 6:
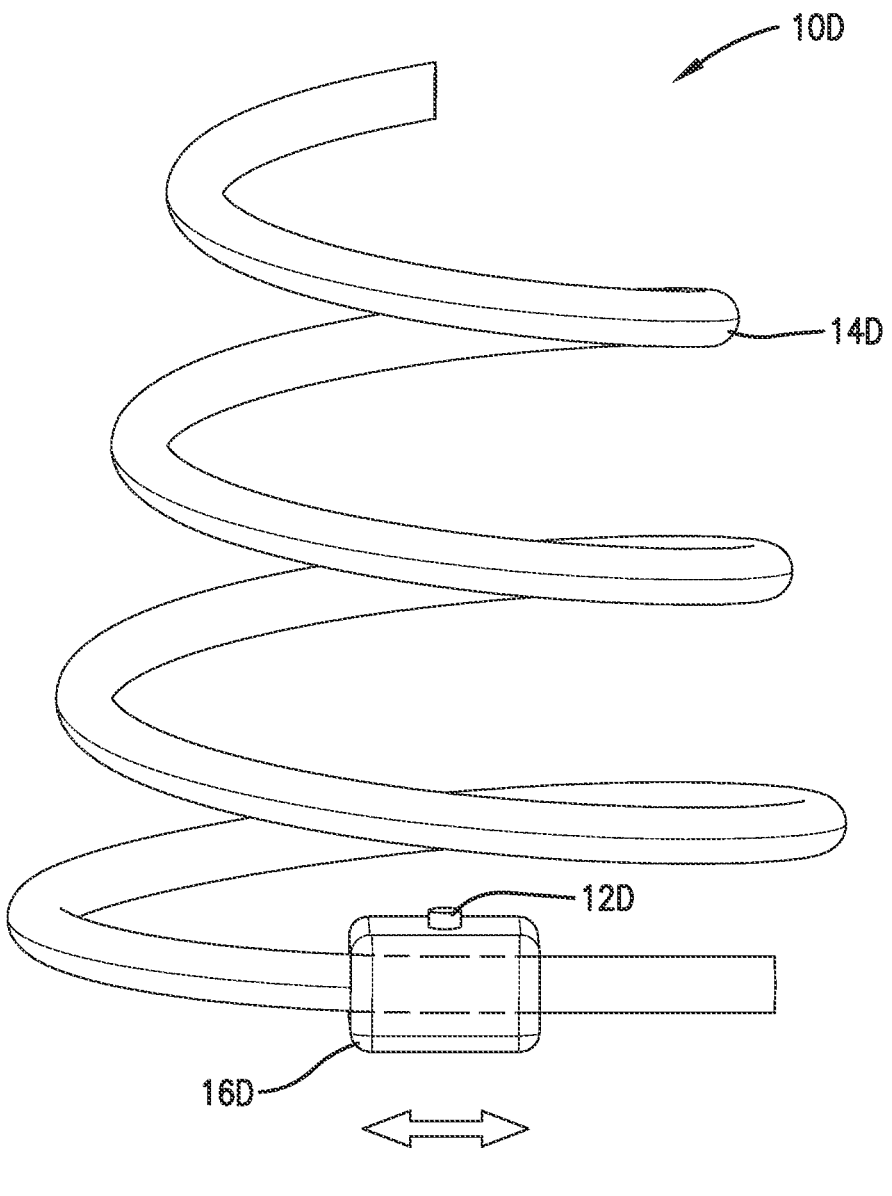
FIG. 6 is a schematic diagram of a system constructed in accordance with another embodiment of the present invention and having a helical stator.

A system 10D constructed in accordance with another embodiment of the invention is shown in FIG. 6. The system 10D is configured to support the device 12D and may comprise substantially similar components as system 10; thus, the components of system 10D that correspond to similar components in system 10 have a 'D' appended to their reference numerals. The principal difference between system 10D and system 10 is that the system 10D comprises a helical stator 14D that propels the armature 16D along a helical path.

The flow chart of FIG. 7 depicts the steps of an exemplary method 100 of testing a device. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-6. The steps of the method 100 may be performed by the controller 22 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, an armature supporting the device is accelerated along a stator. This may include directing, via a processing element, a power supply to activate stator coils supported on the stator and/or rotor coils on the armature to cause the armature to move along the stator and replicate a predetermined time domain waveform. The predetermined time domain waveform may be retrieved, via the processing element, from a memory element and may comprise a vibration, a series of accelerations and/or decelerations, impulses, or the like. This step may include directing, via the processing element, the power supply to activate stacked coils. This step may also include activating, via a PFN of the power supply, the stator coils and/or rotor coils.

Referring to step 102, data associated with movement of the armature may be captured via a sensor. The data may be representative of a position, velocity, vibration, and/or acceleration of the armature. This step may include receiving the data via the processing element.

Referring to step 103, the data may be compared to the time domain waveform to determine a difference between the time domain waveform and the data. For example, the position of the armature may be compared with a desired position of the armature that would result from the time domain waveform being executed. The distance between the two positions may be determined, via the processing element.

Referring to step 104, an amount of power provided to the stator coils and/or the rotor coils may be adjusted to minimize the difference between the data and the time domain waveform. For example, stacked coils may be activated or deactivate to increase force or decrease force, respectively, an amount of current supplied to the stator coils and/or the rotor coils may be adjusted, a number of the stator coils and/or the rotor coils activated may be adjusted, etc.

The method 100 may include additional, less, or alternate steps and/or device(s), including those discussed elsewhere herein. For example, the armature may be decelerated by directing, via the processing element, the power supply to cut power to the stator coils and/or rotor coils and/or to reverse the polarities of the stator coils and/or rotor coils to generate a decelerating force on the armature.

The flow chart of FIG. 8 depicts the steps of an exemplary method 200 of demolishing a structure. In some alternative implementations, the functions noted in the various blocks may occur out of the order depicted in FIG. 8. For example, two blocks shown in succession in FIG. 8 may in fact be executed substantially concurrently, or the blocks may sometimes be executed in the reverse order depending upon the functionality involved. In addition, some steps may be optional.

The method 200 is described below, for ease of reference, as being executed by exemplary devices and components introduced with the embodiments illustrated in FIGS. 1-6. The steps of the method 200 may be performed by the controller 22 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 201, an armature is accelerated along a stator to induce a vibration in the structure. This may include directing, via a processing element, a power supply to activate stator coils supported on the stator and/or rotor coils on the armature to cause the armature to move along the stator and replicate a predetermined time domain waveform. The predetermined time domain waveform may be retrieved, via the processing element, from a memory element and may comprise a vibration, a series of accelerations and/or decelerations, impulses, or the like. This step may include directing, via the processing element, the power supply to activate stacked coils. This step may also include activating, via a PFN of the power supply, the stator coils and/or rotor coils.

Referring to step 202, data representative of a frequency of the structure when the armature is moving along the stator is captured via a sensor. The sensor may be attached to the structure and may be in wired and/or wireless communication with the processing element. The sensor may be configured to transmit the data to the processing element for analysis.

Referring to step 203, a resonant frequency of the structure may be determined based on the data. This step may be performed via the processing element. For example, the data may be determined, via the processing element, to be associated most strongly with a particular vibration frequency induced by the armature out of a plurality of vibration frequencies.

Referring to step 204, the armature is accelerated along the stator to induce a vibration at the resonant frequency. This step may include sensing a response of the structure, via the sensor, to determine a structural defect in the structure. Further, this step may include inducing the resonant frequency in the structure, via the armature, until the structure is destroyed or damaged.

The method 200 may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for shifting a device, the system comprising:
a stator with stator coils;
an armature movably coupled to the stator and configured to support the device and comprising rotor coils;
a power input for coupling with a power supply to provide power to at least one of the stator coils or the rotor coils;
a sensor configured to capture data associated with movement of the armature;
a processing element in communication with the sensor and configured to-
activate at least one of the stator coils or the rotor coils to cause the armature to move along the stator to replicate a predetermined time domain waveform,
receive from the sensor a signal representative of the data,
compare the data to the time domain waveform to determine a difference between the time domain waveform and the data, and
adjust an amount of power provided to at least one of the stator coils or the rotor coils to minimize the difference.

2. The system of claim 1, wherein the rotor coils comprise push rotor coils and pull rotor coils.

3. The system of claim 1, wherein the processing element is configured to activate the stator coils and the rotor coils as stacked coils.

4. The system of claim 1, wherein the stator comprises a titanium core and the stator coils encircle the titanium core.

5. The system of claim 1, wherein the power supply comprises-
a pulse-forming network, and
a supercapacitor connected to the pulse-forming network and configured to provide current to the pulse-forming network.

6. The system of claim 1, wherein the armature comprises an armature body made of carbon fiber.

7. The system of claim 1, wherein the power supply comprises a power source and a plurality of insulated gate bipolar transistors configured to connect the power source and the stator coils when directed by the processing element.

8. The system of claim 7, wherein the plurality of insulated gate bipolar transistors are configured to switch a polarity of at least one of the stator coils or the rotor coils, wherein the processing element is configured to direct the insulated gate bipolar transistors to switch the polarity of at least one of the stator coils or the rotor coils to apply a force in an opposite direction of a motion of the armature.

9. The system of claim 1, wherein the stator forms a closed loop path.

10. The system of claim 1, wherein the time domain waveform comprises at least one of a pulse shock or a vibration.

11. A method of inducing a resonant frequency in a structure, the method comprising:

accelerating an armature along a stator to induce a vibration in the structure;

capturing, via a sensor, data representative of a frequency of the structure when the armature is moving along the stator;

determining the resonant frequency of the structure based on the data; and accelerating the armature along the stator to induce a vibration at the resonant frequency in the structure.

12. The method of claim 11, wherein the stator forms a linear path.

13. The method of claim 11, wherein accelerating the armature along the stator includes directing a power supply comprising a pulse-forming network with a supercapacitor to selectively activate one or more stator coils.

14. The method of claim 11, wherein the stator forms a circular path.

15. A system for inducing a resonant frequency in a structure, the system comprising:

a stator with stator coils;

an armature movably coupled to the stator and comprising rotor coils;

a power input for coupling with a power supply to provide power to at least one of the stator coils or the rotor coils;

a sensor configured to detect vibrations of the structure;

a processing element in communication with the sensor and configured toactivate at least one of the stator coils or the rotor coils to cause the armature to move to induce a vibration in the structure, receive from the sensor a signal representative of data comprising a frequency of vibrations of the structure, determine the resonant frequency of the structure based on the data, and direct the power supply to activate at least one of the stator coils or the rotor coils to induce a vibration in the structure at the resonant frequency of the structure.

16. The system of claim 15, wherein the stator forms a linear track, and the rotor coils comprise push coils and pull coils.

17. The system of claim 15, wherein the stator comprises a titanium core and the stator coils encircle the titanium core.

18. The system of claim 15, wherein the processing element is configured to activate the stator coils and the rotor coils as stacked coils.

19. The system of claim 15, wherein the power supply comprisesa pulse-forming network, and a super capacitor connected to the pulse-forming network and configured to provide current to the pulse-forming network.

20. The system of claim 15, wherein the power supply comprises a power source and a plurality of insulated gate bipolar transistors configured to connect the power source and the stator coils when directed by the processing element.

* * * * *